(12) United States Patent
Horibe et al.

(10) Patent No.: US 7,110,719 B2
(45) Date of Patent: Sep. 19, 2006

(54) INDOOR MOBILE COMMUNICATION DEVICE

(75) Inventors: Akio Horibe, Souka (JP); Hitoshi Hachiga, Ichihara (JP)

(73) Assignee: Uniden Corporation, Tokyo (JP)

( * ) Notice: Subject to any disclaimer, the term of this patent is extended or adjusted under 35 U.S.C. 154(b) by 544 days.

(21) Appl. No.: 10/256,252

(22) Filed: Sep. 27, 2002

(65) Prior Publication Data

US 2004/0043738 A1    Mar. 4, 2004

(30) Foreign Application Priority Data

Sep. 2, 2002    (JP)    ............... 2002-257113

(51) Int. Cl.
H04B 7/00    (2006.01)
H04B 1/06    (2006.01)
H04H 1/00    (2006.01)

(52) U.S. Cl. ............... 455/41.2; 455/3.01; 455/11.1; 455/269; 340/825.22; 340/7.21; 342/422; 342/429

(58) Field of Classification Search ............... 455/41.2, 455/11.1, 436, 439, 458, 500, 73, 550.1, 560, 455/91, 101, 95, 267, 277.1, 90.1, 269, 3.01, 455/3.05; 340/825.22, 825.29, 825.37, 7.21
See application file for complete search history.

(56) References Cited

U.S. PATENT DOCUMENTS

| | | | | |
|---|---|---|---|---|
| 5,533,027 A | * | 7/1996 | Akerberg et al. | 370/347 |
| 5,826,201 A | * | 10/1998 | Gratias | 455/575.5 |
| 5,898,405 A | * | 4/1999 | Iwasaki | 343/700 MS |
| 6,041,237 A | * | 3/2000 | Farsakh | 455/450 |
| 6,563,465 B1 | * | 5/2003 | Frecska | 343/700 MS |
| 6,751,444 B1 | * | 6/2004 | Meiyappan | 455/69 |

FOREIGN PATENT DOCUMENTS

| | | |
|---|---|---|
| JP | 2-114794 | 4/1990 |
| JP | 3-228407 | 10/1991 |
| JP | 5-22030 | 1/1993 |
| JP | 6-53735 | 2/1994 |
| JP | 7-106844 | 4/1995 |
| JP | 8-32344 | 2/1996 |
| JP | 9-284041 | 10/1997 |
| JP | 10-93332 | 4/1998 |
| JP | 11-355022 | 12/1999 |
| JP | 2000-59131 | 2/2000 |

(Continued)

*Primary Examiner*—Nguyen T. Vo
*Assistant Examiner*—Thuan T. Nguyen
(74) *Attorney, Agent, or Firm*—McDermott Will & Emery LLP

(57) ABSTRACT

It is an object of the present invention to provide an indoor mobile communication device having a simple structure, providing a sufficient communication range, and also providing for stable communication with a small fading effect. In order to attain this object, the present invention provides an indoor mobile communication device which is equipped with an antenna with fixed direction characteristics such as electromagnetic wave emission direction and half-power angle and is capable of mobile communications, while freely changing the position and direction inside an indoor space, this device comprising an antenna for transmission and reception of linearly polarized waves, the antenna having a half-power angle within 180 degrees and a directivity such that the emission level within a range of from 90 degrees to 270 degrees, as measured from the maximum emission direction, is less than the maximum emission level by 10 dB or more and a wireless unit for conducting modulation and demodulation of the signals superimposed on the electromagnetic waves transmitted and received via the antenna.

4 Claims, 6 Drawing Sheets

FOREIGN PATENT DOCUMENTS

| | | |
|---|---|---|
| JP | 2000-307341 | 11/2000 |
| JP | 2002-43833 | 2/2002 |

* cited by examiner

ACCUMULATED PROBABILITY DISTRIBUTION

INDOOR MOBILE COMMUNICATION DEVICE

BACKGROUND OF THE INVENTION

1. Field of the Invention

The present invention relates to an indoor mobile communication device such as a cordless telephone and the like, more specifically, to improved technology providing for a simple structure, small fading effect, and stable communication.

2. Description of the Related Art

In indoor mobile communication devices such as cordless telephones and the like, the positions of communicating parties are not constant and the indoor environment, for example, the size of rooms can change. For those reasons it is necessary that the devices have a structure allowing for the reception of electromagnetic waves arriving from a variety of directions and for the transmission of electromagnetic waves in all direction. In prior art, vertical linear antennas, which are nondirectional in a horizontal plane, have been widely used.

However, in indoor mobile communication devices using a high frequency, the antennas become small because of a short wavelength. In such a case, however, the effective length of nondirectional antennas is decreased and the range in which communication is possible is narrowed. Furthermore, if electromagnetic waves that have passed various propagation paths in the indoor environment are received, the reception is affected by fading and stable communication is difficult to conduct. Furthermore, systems conducting communication by switching directivity have also been suggested, but such systems are complex and expensive.

Accordingly, it is an object of the present invention to provide an indoor mobile communications device having a simple structure, providing a sufficient range in which communication is possible, and also providing for stable communication with a small fading effect.

SUMMARY OF THE INVENTION

In order to attain this object, the present invention provides an indoor mobile communication device which is equipped with an antenna with fixed directional characteristics such as electromagnetic wave emission direction and half-power angle and is capable of mobile communication, while freely changing the position and direction inside an indoor space, this device comprising an antenna for transmission and reception of linearly polarized waves, the antenna having a half-power angle within 180 degrees and a directivity such that the emission level within a range of from 90 degrees to 270 degrees, as measured from the maximum emission direction, is by no less than 10 dB less than the maximum emission level and a wireless unit for conducting modulation and demodulation of signals superimposed on the electromagnetic waves transmitted and received via the antenna. With such a structure, good communication can be conducted by using indoor reflected waves, while providing a sufficient range in which communication is possible. Moreover, stable communication hardly affected by fading can be conducted.

Preferably, the antenna is a planar inverted-F antenna or microstrip antenna. If a planar inverted-F antenna or microstrip antenna is used, the structure can be simplified, the communication device can be miniaturized, and the cost can be reduced.

Preferably, a ground plane of said antenna is arranged on back surface of a circuit packaging surface of a printed circuit board having said wireless unit mounted thereon. With such a structure, the number of components can be reduced, the number of production steps can be decreased, and radio-frequency loss can be reduced. Moreover, a degree of freedom in arranging the antenna inside the communication device can be increased.

Preferably, the device additionally comprises two above-described antennas emitting mutually orthogonal linearly polarized waves and an antenna switching circuit for diversity transmission and reception which conducts connection and switching of those antennas. Diversity transmission and reception provides for stable communication.

DESCRIPTION OF THE PREFERRED EMBODIMENTS

An embodiment of the present invention will be described below with reference to the appended drawings.

Figure 1:
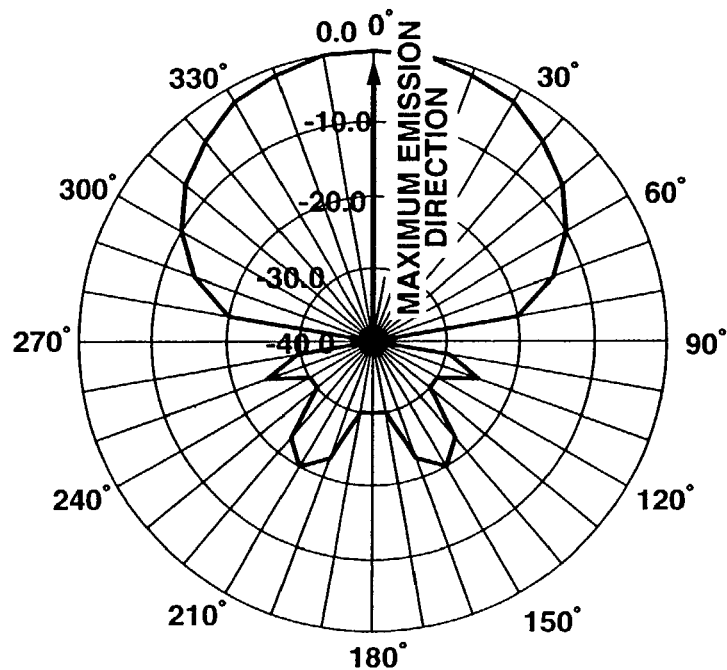
FIG. 1 is a graph illustrating the directivity of the antenna of the present embodiment in a horizontal plane in the free space.

FIG. 1 is a graph illustrating an example of the directivity of the antenna of the present embodiment in a horizontal plane in a free space. As shown in the figure, the antenna of the present embodiment is designed within a half-power angle of 180 degrees and has a characteristic such that the emission level within a range of from 90 degrees to 270 degrees, as measured from the maximum emission direction, is by no less than 10 dB less than the maximum emission level.

If electromagnetic waves are thus emitted with good efficiency within a range of the maximum emission direction ±90 degrees, an about two-fold gain (about 3 dB) can be obtained and the range of possible communication can be expanded by comparison with the case of electromagnetic wave emission in all directions by using a nondirectional antenna. Further, reducing the directivity of antenna to about half of all directions makes it difficult to pick up electromagnetic waves from a direction with a low directivity gain. However, because furniture, walls, and the like are present in the vicinity of communication devices in indoor communication, good communication can be conducted by using the reflected waves produced by reflection from the furniture, walls, and the like, even without directivity toward the other communication party.

Figure 8:
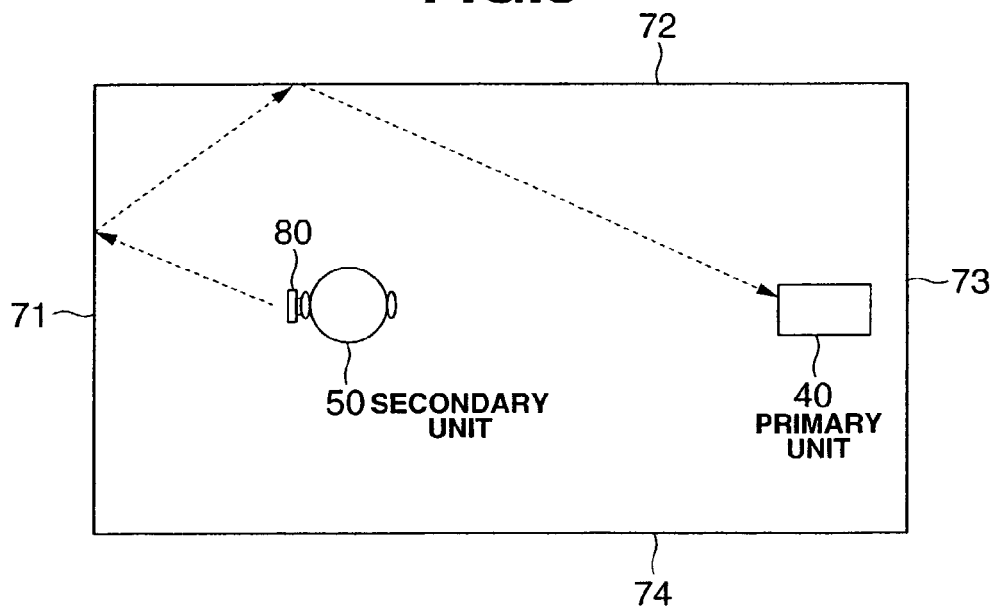
FIG. 8 is an explanatory view illustrating the electromagnetic wave propagation path in indoor mobile communication.

FIG. 8 illustrates an electromagnetic wave propagation state in which a secondary unit 50 of a cordless phone equipped with an antenna 80 of the present embodiment and a primary unit 40 communicate in the indoor space surrounded by walls 71–74. It the directivity of antenna 80 is assumed to have the above-described characteristic, even if primary unit 40 is not positioned in the direction of antenna 80, electromagnetic waves reflected from walls 71, 72 reach primary unit 40 and electromagnetic waves from primary unit 40 also reach secondary unit 50 upon reflection from the walls. As a result stable communication can be conducted by effectively using the reflected waves.

Furthermore, as shown in FIG. 1, the antenna of the present embodiment can reduce the effect of fading that can be produced by interference of electromagnetic waves arriving via multiple paths, such as direct waves and reflected waves, because the antenna has a low directivity gain within a range of from 90 degrees to 270 degrees, as measured from the maximum emission direction, among the electromagnetic waves arriving from all directions. Thus, in the indoor communications, providing an antenna with a certain directivity makes it possible to expand easily the range of possible communication and to guarantee good communication by using reflected waves, even without directing the antenna toward the other communication party, as compared with using a non-directional antenna which is capable of picking up electromagnetic waves from all directions. If the directivity of antenna is reduced to a narrow range, the antenna gain is increased and even weak reflected waves arriving from the directivity direction can be picked up. Moreover, since multiple reflected waves are not received, fading is small. On the other hand, the probability of picking up the direct or reflected waves arriving from the directivity direction is decreased. By contrast, if the directivity of antenna is within a wide range, the probability of picking up the direct or reflected waves is increased, but the antenna gain is reduced and fading is caused by interference of multiple reflected waves.

In other words, there is a tradeoff between the reception level fluctuations caused by antenna direction and the reception level fluctuations caused by fading. And the antenna directivity optimum for indoor communication has to be studied to allow for stable communication with small fading, while reliably picking up electromagnetic waves regardless of antenna direction. The research conducted by the inventors confirmed that reflected waves from furniture, walls, and the like can be effectively picked up and good communication with a little effect of fading can be guaranteed, while providing the appropriate antenna gain, if a half-power angle is designed within 180 degrees and the emission level is increased for about half of all directions as the characteristics of the antenna of the indoor mobile communications device. Those advantages are demonstrated especially effectively in indoor mobile communication devices using a frequency of no less than 5 GHz.

FIGS. 9 to 12 illustrate an example of a graph representing the results of fading simulation during mobile communication in the indoor space. FIG. 13 illustrates an electromagnetic wave reception environment for conducting fading simulation. As shown in the figure, in the course of simulation, a square indoor space with a side of 5 meters was assumed and the level of received signals was calculated with respect to a case in which a 5.8 GHz electromagnetic wave was emitted by a non-directional antenna from a central point Q of the space and the electromagnetic wave reception point P was moved parallel to the wall from point A located at a distance of 50 cm from the wall to point B located at a distance of 2 m from point A. The simulation conditions were as follows: reflection coefficient of the walls −0.9, reflection from the ceiling and floor is not considered, and the reflection at walls proceeds up to three times. Further, the vertical surface directivity of antenna was not changed and only the horizontal wall directivity changed. The antenna gain was considered to increase and the efficiency was considered to be constant as the directivity angle is narrowed.

Figure 9:
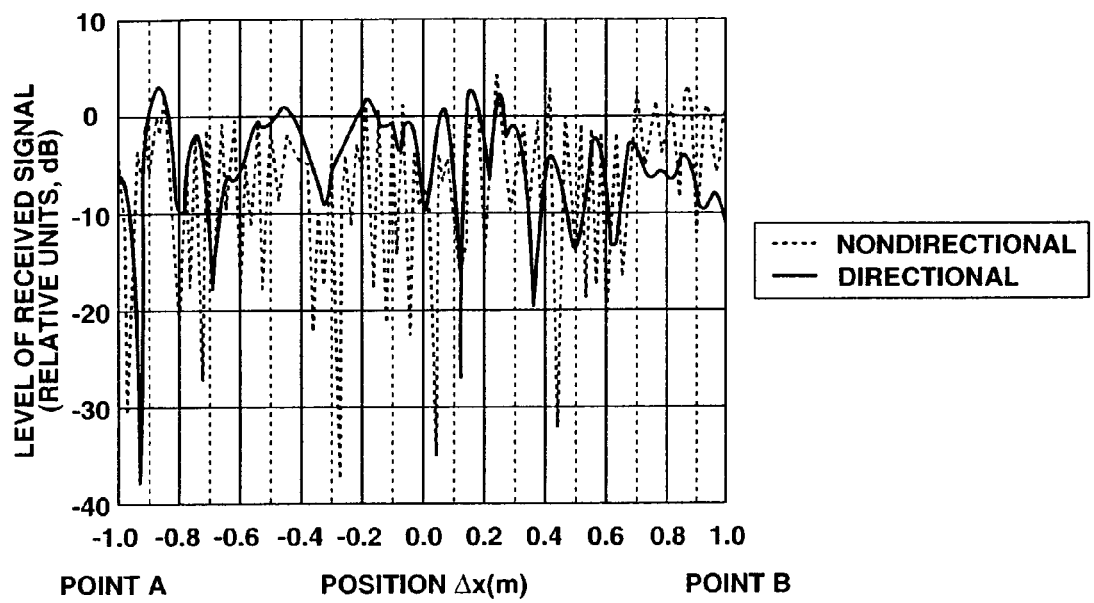
FIG. 9 is a graph illustrating the results of fading simulation.

FIG. 9 is an example of the graph obtained by measuring the reception level of a combined wave of the direct wave and reflected wave in each of the points (a total of 2000 points) spaced by 1 mm within a range traveled by the reception point P from point A to point B. The coordinates of point A and point B on the abscissa are −1 m and 1 m, respectively. The level of received signal is plotted against the ordinate. An assumption was made in the calculation that the angle of beam spread of the directional antenna is 140 degrees and the movement direction of reception point P is identical to the maximum emission direction. The direct wave and reflected wave arriving within the range of the angle of beam spread are combined without overlapping, but the electromagnetic waves arriving outside the angular range of the angle of beam spread are not combined. The reception level of the nondirectional antenna was also calculated in the simulation. As shown in the figure, the fading period of directional antenna is longer than that of the nondirectional antenna. This is because the nondirectional antenna picks up electromagnetic waves that arrived from all directions, whereas in the directional antenna the arrival directions of electromagnetic waves that can be received are limited. Those results led to a conclusion that directional antennas are more preferred as antennas for indoor communication because of a small effect relating to fading.

Figure 10:
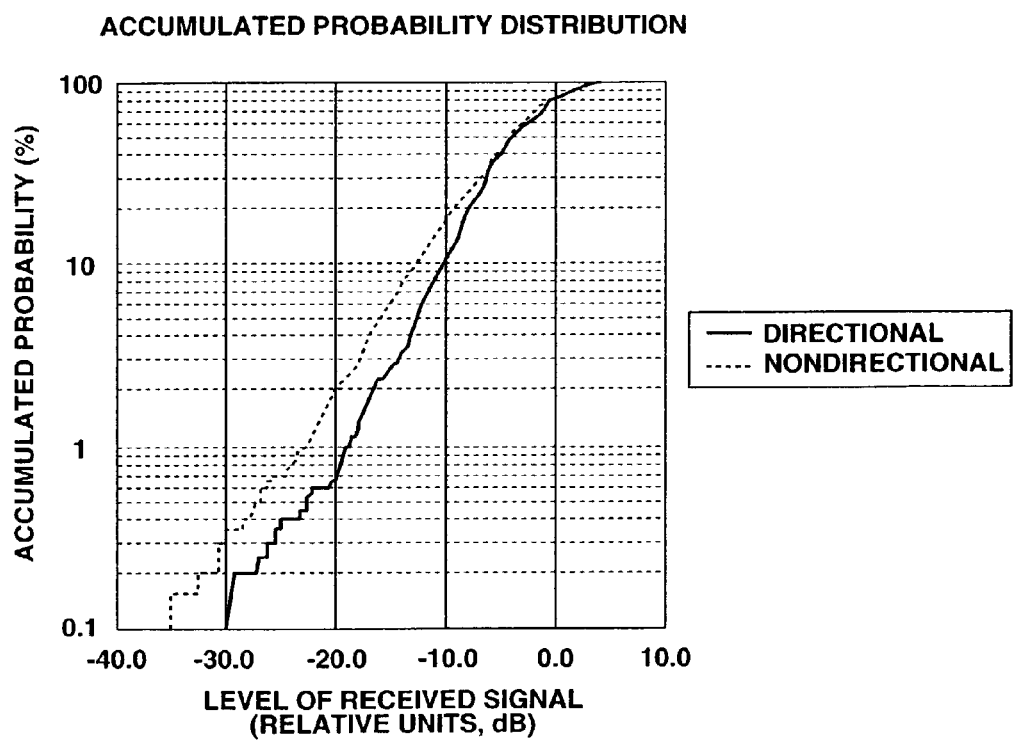
FIG. 10 is a graph illustrating the accumulated probability distribution of the reception level.

FIG. 10 is a graph illustrating the accumulated probability distribution of the reception level in 2000 points shown in FIG. 9. The level of received signal is plotted against the abscissa and the accumulated probability distribution is plotted against the ordinate. Statistics were found for the above-described directional antenna and nondirectional antenna. The reception level at which the accumulated probability distribution becomes 50% is the central value of fading, the difference between the reception levels corresponding to an accumulated probability distribution of 50% and 10% is a fading depth, and the difference between the reception levels corresponding to a accumulated probability distribution of 50% and 90% is a fading rise. Here, the reception level in the path from the above-mentioned point A and point B was calculated. The symmetry of the indoor space shown in FIG. 13 suggests that the same effect can be obtained when the reception point moves along the entire perimeter parallel to the walls.

Figure 11:
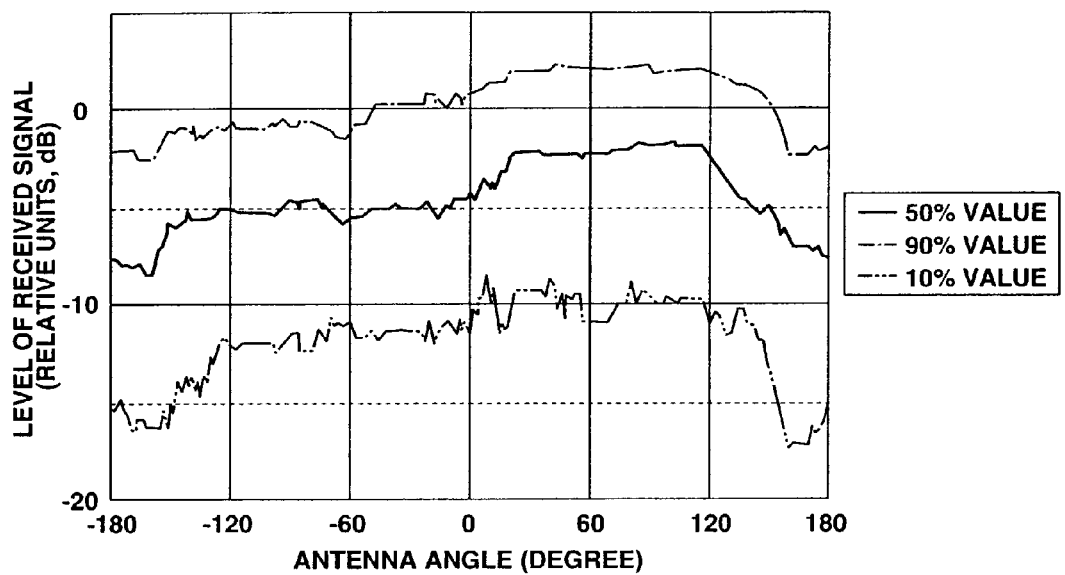
FIG. 11 is a graph illustrating the reception level obtained when the antenna angle was changed.

FIG. 11 is an example of the graph obtained by calculating the reception level at which the accumulated probability distribution in each direction becomes 10%, 50%, and 90%. In this case, the simulation identical to that illustrated by FIG. 10 was conducted 360 times for all direction, while changing the antenna angle in reception point P by 1 degree.

The antenna angle in reception point P is plotted against the abscissa, and the level of received signals is plotted against the ordinate. This figure shows that if a directional antenna is used, the reception level increases or decreases depending on the antenna angle. This is because in the case of narrow directivity only electromagnetic waves arriving from a specific direction are picked up. In case of nondirectional antennas, the reception level is obviously constant, regardless of the antenna angle, and changes in the reception level caused by the antenna angle decrease as the directivity range is expanded.

Figure 12:
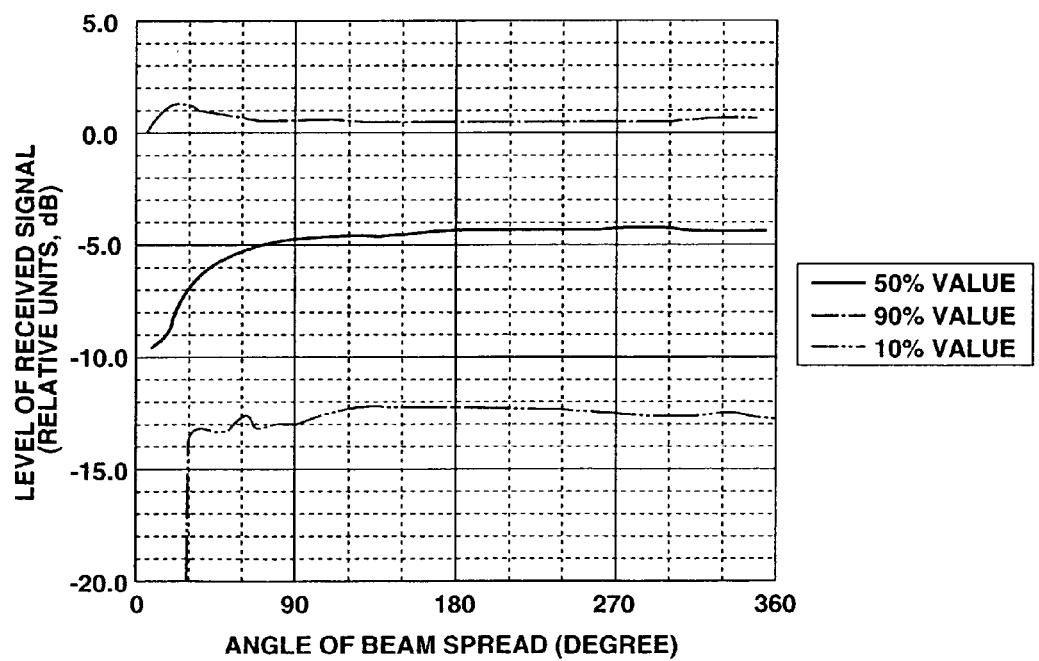
FIG. 12 is a graph illustrating the reception level obtained when the angle of beam spread was changed.
Figure 13:
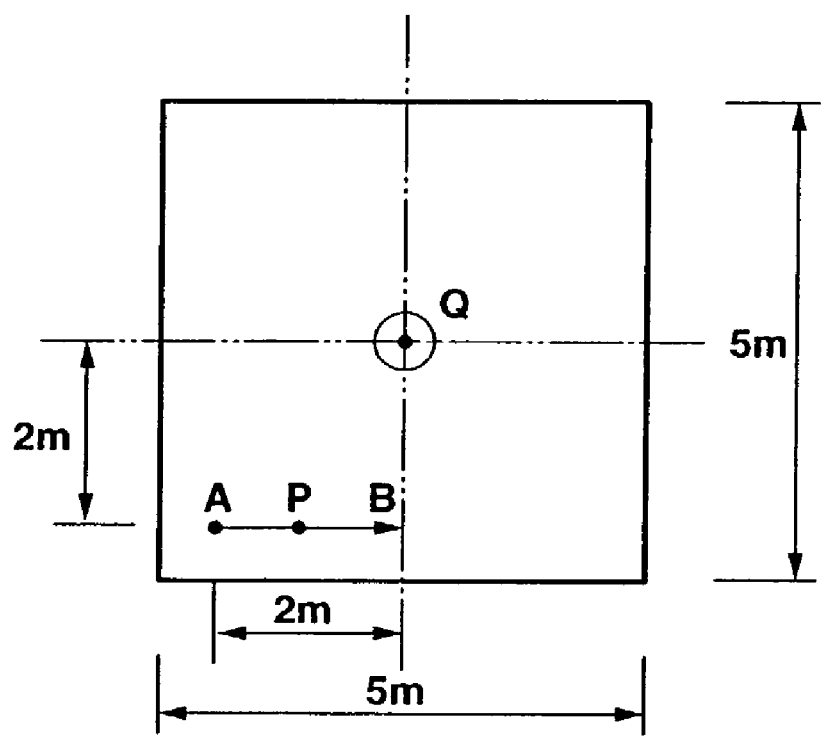
FIG. 13 is an explanatory view illustrating the wireless environment used for the simulation.

FIG. 12 is a graph illustrating the calculation results obtained in repeated simulation identical to that illustrated by the above-mentioned FIG. 11, in which the angle of beam spread in reception point P was changed within a range of from 0 degree to 360 degree. The figure shows that at a beam spread angle of 140 degrees, the reception level at which the accumulated probability distribution reaches 50% decreases by 0.2 dB with respect to that obtained with a nondirectional antenna, but the reception level at which the accumulated probability distribution becomes 10% increases by 0.7 dB with respect to that obtained with the non-directional antenna. This means the reduction of interruptions and noise in indoor mobile communication. On the other hand, the 0.2 dB decrease in the reception level at which the accumulated probability distribution becomes 50% produces little effect on the quality of communication. Furthermore, when the angle of beam spread is as narrow as no more than 30 degrees, the range of directions from which the direct wave or reflected wave cannot be received increases, which results in increased fluctuations of the reception level. In such a case, the interruptions in communication apparently occur because of the antenna direction. However, in the present simulation, the number of reflections was limited to no more than three. Therefore, there is a possibility that the reception level fluctuations of the antenna with a narrow directivity will somewhat decrease if the waves that underwent no less than four reflections are taken into account.

Furthermore, if a nondirectional antenna is used in case of a secondary unit of a cordless phone, the utilization of a directional antenna having directivity toward a human head and in the opposite direction is more effective than the utilization of a nondirectional antenna in indoor communication if the absorption and reflection by human head and decrease in antenna efficiency are taken into account. Taking account of the above-described simulation results, the angle of beam spread is preferably within 180 degrees and even more preferably within a range of 60–180 degrees.

A linearly polarized wave is preferably used in the antenna employed for indoor communication. If a circularly polarized wave is used, the reflected wave is inversely rotated with respect to the traveling wave and cannot be received. However, using a linearly polarized wave makes possible the effective use of the reflected waves. Furthermore, with the indoor mobile communication device equipped with the antenna having the above-described directivity, stable communication can be conducted without switching or changing the emission direction or the half-power angle. Therefore, the system design is facilitated and the loss of radio-frequency power can be reduced by not having antenna switching and the cost of communications equipment can be decreased.

The antenna for indoor communication in accordance with the present invention can be easily formed as a comparatively small unit, while providing for the above-described characteristics, by using planar antennas such as an inverted-F type antenna by sheet metal or a microstrip antenna. In particular, because a small size of the housing and decreased thickness thereof are required for mobile communication devices such as cordless phones, using such planer antennas has a merit of allowing the increase in the housing thickness, while maintaining good communication quality. Another merit of microstrip antennas is that they are easy to manufacture.

Figure 3:
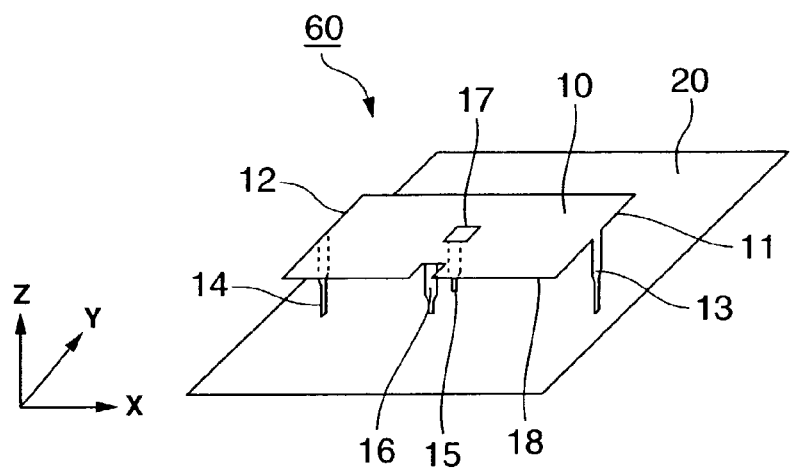
FIG. 3 illustrates the structure of the microstrip antenna of the present embodiment.
Figure 4:
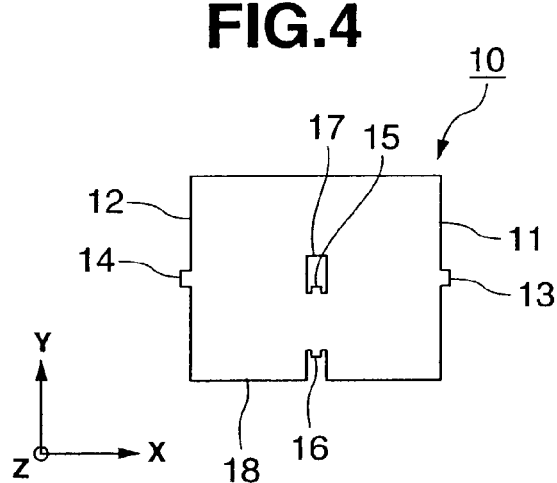
FIG. 4 is a plan view of an emission plate of the microstrip antenna of the present embodiment.

FIG. 3 is a perspective view of the microstrip antenna which is an embodiment of the present invention. FIG. 4 is a plan view of the antenna. The explanation herein is conducted with reference to a rectangular patch antenna as an example, but the present invention is not limited thereto and a round patch antenna may be employed. As shown in FIG. 3, a microstrip antenna 60 has a structure comprising a ground plane (ground plate) 20 and a rectangular emission plate 10 arranged at a constant distance from ground plane 20 almost parallel thereto. In case of cordless telephony using a 5.8 GHz band, the size of emission plate 10 may be 21 mm×30 mm and the distance between emission plate 10 and ground plane 20 may be 2 mm. As shown in the figure, if XYZ coordinates are set in three orthogonal directions, then the length of two sides 11, 12 of emission plate 10 which are arranged opposite each other and parallel to the Y direction is designed so as to be about ½ of wavelength. In the central portions of those sides 11, 12, support pins 13, 14 are formed by bending the plate in order to maintain a constant distance between emission plate 10 and ground plane 20.

Figure 5:
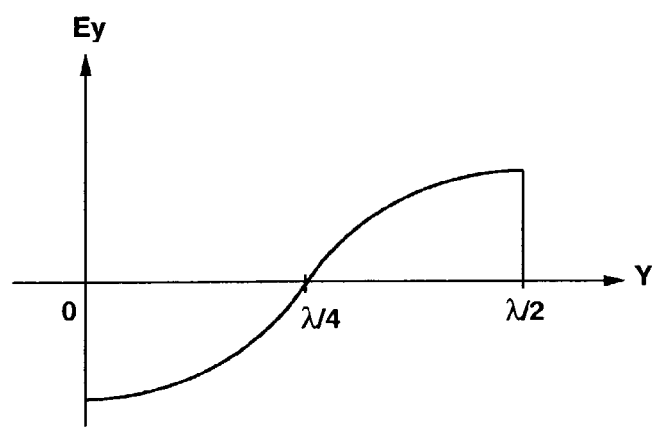
FIG. 5 is a graph illustrating the electric field distribution in the Y direction of the microstrip antenna.

FIG. 5 is a graphical representation of electric field distribution in the Y direction of microstrip antenna 60. As shown in the figure, in a state in which a linearly polarized wave is emitted in the Y direction, with the resonance being in the same direction, the intensity of electric field in the center of sides 11, 12 becomes zero. Therefore, the electric field distribution is not changed even if electric conductors such as support pins 13, 14 are formed in the center of sides 11, 12. Forming support pins 13, 14 in the central portions of sides 11, 12 where the intensity of electric field in the Y direction is zero and electrically connecting the pins to ground plane 20 makes it possible to obtain a mechanical strength desirable for maintaining a constant distance between emission plate 10 and ground plane 20 and also to suppress the resonance in the X direction and suppress the generation of cross polarized waves. Furthermore, even-mode resonance in the Y direction and even-order harmonics can be also suppressed.

As shown in FIG. 3 and FIG. 4, a slit-like opening 17 with a small length in the X direction and a large length in the Y direction is formed in approximately a central portion of emission plate 10 and a support pin 15 extending in the direction of ground plane 20 is formed by bending the plate from the edge of the opening to an almost perpendicular position. Support pin 15 can be added because the distribution of electric field does not change even if the support pin 15 formed in the central portion in the Y direction is electrically connected to ground plane 20. Further, because the electric current flowing over emission plate 10 flows only in the Y direction, even though the slit-like opening 17 with a small length in the X direction and a large length in the Y direction is formed, it produces almost no effect on the electric field distribution. Thus, mechanical strength of antenna can be increased by forming support pin 15 in almost the central portion of emission plate 10.

Furthermore, when the distance between emission plate 10 and ground plane 20 is small, the impedance of antenna is low and a power feed point for matching with the circuit is preferably provided somewhat on the inside of side 18 parallel to the X direction. For this purpose, as shown in the figure, a notch is formed in almost the central part of side 18 and a power feed pin 16 is formed by bending the notch almost perpendicularly to ground plane 20. Because the notch is very small, the effect produced thereby on emission characteristic of the antenna is within a range which can be practically ignored. Further, because the power feed pin 16 can be fabricated by merely bending the plate, the number of components can be reduced, the assembly operation can be facilitated, and mechanical strength can be increased.

Figure 2:
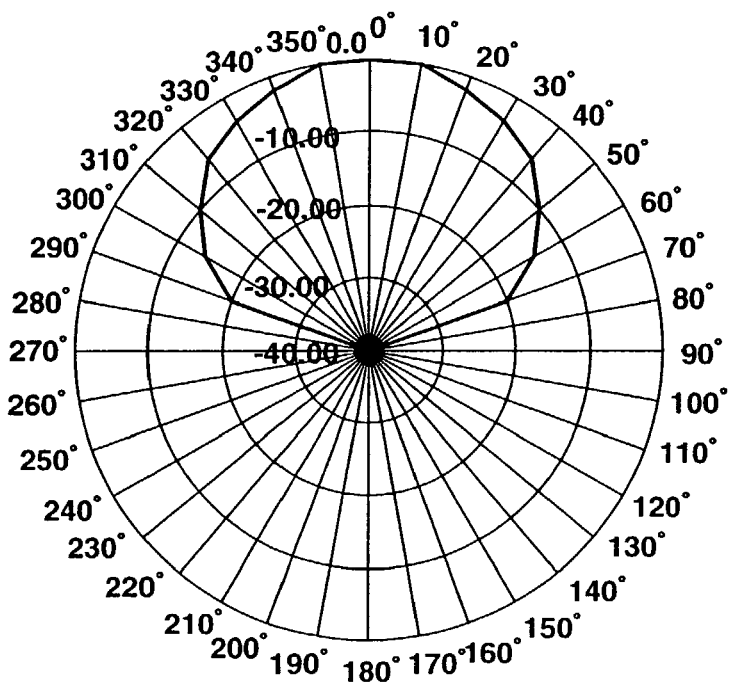
FIG. 2 is a graph illustrating the directivity of the microstrip antenna of the present embodiment in a horizontal plane in the free space.

Further, distal ends of support pins 13, 14, 15 and feed pin 16 have a constricted shape and the assembly is facilitated because the emission plate 10 can be simply secured by inserting the distal ends into the holes drilled in advance in the ground plane 20. The microstrip antenna 60 of the present embodiment therefore has a low cost and is cost efficient because it can be easily assembled by merely bending the sheet metal by conducting simple processing. FIG. 2 is a graph illustrating the directivity of the above-described microstrip antenna 60 in a horizontal plane of a free space. As shown in the figure, microstrip antenna 60 is designed within a half-power angle of 180 degrees and almost all of the emitted electromagnetic waves are contained within the maximum emission direction ±70 degrees.

Figure 6:
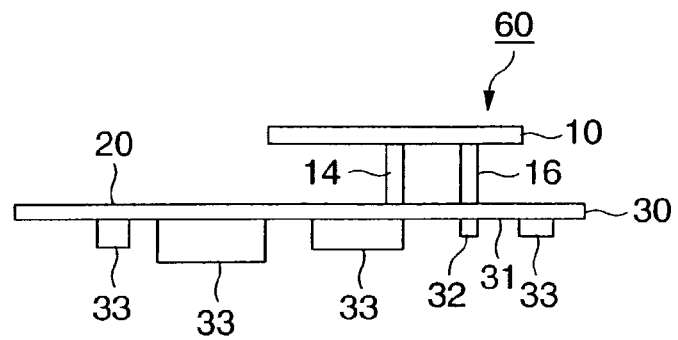
FIG. 6 is a side view of a printed wiring board having the microstrip antenna mounted thereon.

FIG. 6 is a side view of microstrip antenna 60. A radio-frequency circuit component 33 constituting a wireless unit conducting modulation and demodulation of signals superimposed on electromagnetic wave is mounted on a circuit packaging surface 31 of printed circuit board 30. A copper foil functioning as a ground plane 20 is laminated via an insulating layer on the rear surface. A hole for inserting feed pin 16 is provided in printed circuit board 30, and feed pin 16 inserted through the hole and exposed on circuit mount surface 31 is soldered in an antenna feed portion 32 and connected to a wireless unit of cordless phone. Arranging microstrip antenna 60 on printed circuit board 30 makes it possible to reduce the number of components and decrease the number of production steps, without using a feed wire.

Further, because it is not necessary to draw a radio-frequency cable from printed circuit board 30 to microstrip antenna 60, radio-frequency loss causes no concerns and microstrip antenna 60 can be disposed in an appropriate position in the housing of a cordless phone. As a result, the microstrip antenna 60 can also be arranged in a high position inside the housing, taking into account the effect of surrounding obstacles. Further, when the cordless phone is disposed on a wall, care can be taken to arrange the antenna in a position at a sufficient distance (for example, 1 wavelength) from the back surface of the housing in order to prevent the antenna from being affected by the wall.

Moreover, in the prior art, when the printed circuit board and antenna were separate components, the characteristics of antenna depended on mutual arrangement thereof. For this reason, the antenna had to be located well off the other circuit components. Moreover, in case of nondirectional antenna, there was a restriction that metal components such as circuit components cannot be arranged above the antenna. However, with the present invention, arranging microstrip antenna 60 on printed circuit board 30 makes it possible to increase the degree of freedom in selecting the mounting position of microstrip antenna 60.

Figure 7:
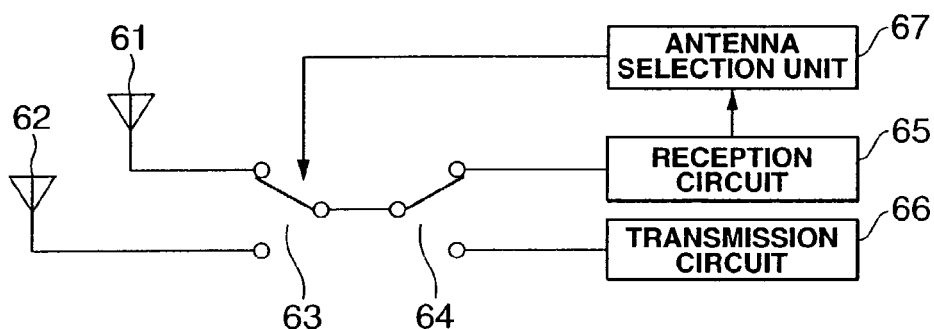
FIG. 7 illustrates the structure of a diversity receiver using the antenna of the present embodiment.

FIG. 7 illustrates the structure of a diversity transceiver using the antenna in accordance with the present invention. Referring to the figure, 61, 62 are antennas emitting mutually orthogonal linearly polarized waves and designed within a half-power angle of 180 degrees. The antennas have a directivity such that the emission level within a range of from 90 degrees to 270 degrees, as measured from the maximum emission direction is by no less than 10 dB less than the maximum emission level. The reception signals received by antennas 61, 62 are sent to a reception circuit 65 via the antenna switching circuit 63, 64. The antenna selection is conducted by an antenna selection unit 67 depending on the reception quality of reception circuit 65 and the selected signal is output to the antenna switching circuit 63. During transmission, the reception and transmission systems are switched by an antenna switching circuit 64, and transmission is conducted by using the antenna selected during the reception. In case of indoor communication, the polarization direction of electromagnetic waves reflected by the walls, furniture, and ceiling sometimes changes because of mutual arrangement with the reflecting bodies. In such cases, more stable communication can be conducted by using two antennas 61, 62 emitting mutually orthogonal linearly polarized waves and selecting an antenna which is more effective in terms of communications.

What is claimed is:

1. An indoor mobile communications device which is equipped with an antenna with fixed direction characteristics including electromagnetic wave emission direction and half-power angle and is capable of mobile communication, while freely changing the position and direction inside an indoor space, said device comprising:

an antenna for transmission and reception of linearly polarized waves, said antenna having a half-power angle within 180 degrees and a directivity such that the emission level within a range of from 90 degrees to 270 degrees, as measured from the maximum emission direction, is less than the maximum emission level by 10 dB or more; and a wireless unit for conducting modulation and demodulation of signals superimposed on the electromagnetic waves transmitted and received via said antenna.

2. The indoor mobile communications device according to claim 1, wherein said antenna is a planar inverted-F antenna or microstrip antenna.

3. The indoor mobile communications device according to claim 1, wherein a ground plane of said antenna is arranged on the back surface of a circuit packaging surface of a printed circuit board having said wireless unit mounted thereon.

4. The indoor mobile communications device according to claim 1, further comprising two said antennas emitting mutually orthogonal linearly polarized waves and an antenna switching circuit for diversity transmission and reception which conducts connection and switching of those antennas.

* * * * *